(12) United States Patent
Guerin et al.

(10) Patent No.: US 8,582,294 B2
(45) Date of Patent: Nov. 12, 2013

(54) ELECTRICAL SUPPLY DEVICE COMPRISING TRAY TO RECEIVE ULTRA HIGH-CAPACITY STORAGE UNITS

(75) Inventors: Fabien Guerin, Chatillon (FR); Roger Abadia, Neuilly-Plaisance (FR); Patrick Rondier, Montmagny (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 472 days.

(21) Appl. No.: 12/745,947

(22) PCT Filed: Dec. 4, 2008

(86) PCT No.: PCT/FR2008/052201
§ 371 (c)(1),
(2), (4) Date: Dec. 27, 2010

(87) PCT Pub. No.: WO2009/080936
PCT Pub. Date: Jul. 2, 2009

(65) Prior Publication Data
US 2011/0090614 A1    Apr. 21, 2011

(30) Foreign Application Priority Data
Dec. 6, 2007  (FR) ..................... 07 59606

(51) Int. Cl.
*H05K 7/20* (2006.01)
(52) U.S. Cl.
USPC ........... 361/688; 361/328; 361/690; 320/107; 320/112; 429/99; 429/120
(58) Field of Classification Search
None
See application file for complete search history.

(56) References Cited

U.S. PATENT DOCUMENTS

| | | | |
|---|---|---|---|
| 4,670,814 A | 6/1987 | Matsui et al. | |
| 6,265,840 B1 * | 7/2001 | Wiezorek et al. | 318/434 |
| 6,541,942 B1 * | 4/2003 | Francis | 320/166 |
| 7,427,851 B2 * | 9/2008 | Takemoto et al. | 320/166 |
| 7,440,258 B2 * | 10/2008 | Thrap et al. | 361/502 |
| 7,547,233 B2 * | 6/2009 | Inoue et al. | 439/627 |
| 7,764,496 B2 * | 7/2010 | Nguyen et al. | 361/697 |
| 7,859,844 B2 * | 12/2010 | Nguyen et al. | 361/697 |
| 7,942,700 B2 * | 5/2011 | Gutierrez et al. | 439/620.05 |
| 7,974,101 B2 * | 7/2011 | Azuma et al. | 361/760 |
| 8,134,343 B2 * | 3/2012 | Like et al. | 320/166 |
| 8,194,393 B2 * | 6/2012 | Inoue et al. | 361/328 |
| 2010/0119921 A1 * | 5/2010 | Meijering et al. | 429/72 |
| 2010/0129703 A1 * | 5/2010 | Caumont et al. | 429/120 |
| 2011/0045342 A1 * | 2/2011 | Dessirier et al. | 429/175 |

FOREIGN PATENT DOCUMENTS

| | | |
|---|---|---|
| CN | 1449072 | 10/2003 |
| DE | 198 14 700 A1 | 10/1999 |
| FR | 2 492 577 | 4/1982 |
| FR | 2 883 670 | 9/2006 |
| GB | 1 567 519 | 5/1980 |
| WO | WO 98/14965 | 4/1998 |

* cited by examiner

*Primary Examiner* — Boris Chervinsky
(74) *Attorney, Agent, or Firm* — Beranato & White, LLC (57) ABSTRACT

An electrical power supply device for a motor vehicle, which includes a tray made of a heat-conducting material, in which there is positioned at least one ultra-high capacity energy storage unit liable to emit heat, the tray including at least one housing to accommodate at least one electrical energy storage unit with the presence of a heat-conducting layer made of a heat conducting adhesive or a heat-conducting resin interposed without clearance between the storage unit and the interior face of the wall of the associated housing so as to conduct the heat emitted by the unit.

16 Claims, 9 Drawing Sheets

ELECTRICAL SUPPLY DEVICE COMPRISING TRAY TO RECEIVE ULTRA HIGH-CAPACITY STORAGE UNITS

FIELD OF THE INVENTION

The invention relates to an electrical supply device for a motor vehicle, which comprises a tray in which there is provided at least one ultra high-capacity electrical energy storage unit which can emit heat, the said tray comprising at least one receptacle for receipt of at least one electrical energy storage unit.

BACKGROUND OF THE INVENTION

Numerous examples of devices of this type are known.

Such electrical supply devices are used for example to supply electrical machines of motor vehicles of the electric and/or hybrid type, i.e. which combine an electrical machine and a conventional thermal engine, for which it is important to be able to recuperate the kinetic energy in order to re-charge the vehicle battery and to supply the on-board network with electric power. This function is commonly known as recuperative braking. A battery of the metal hydride type is used, for example.

However, these electrical supply devices pose many problems.

In fact, the energy storage units undergo many cycles of charging and discharging. For example, when the motor vehicle starts, a very intense discharge of electricity occurs. Also for example, the storage units are charged with a high-intensity electric current during periods of recuperative braking.

When electric current is released during discharge operations, or when it is stored during charging operations, the ultra high-capacity storage units release more heat than conventional batteries. The quantity of heat released is proportional to the intensity of the electric current which circulates during charging or discharging.

In addition, these charging and discharging cycles can succeed one another at a very fast pace, in particular when the vehicle is travelling in town and the driver has to stop and restart the vehicle frequently.

However, in order for the storage units to be able to store the electric current efficiently, they must be kept below a maximum operating temperature.

When the charging and discharging cycles follow on from one another rapidly, the temperature of the storage units can rise very quickly to above the maximum operating temperature. The temperature increase of the storage units is all the faster since they are contained in a closed tray.

In addition, the service life of each storage unit depends on the temperature variations to which the units are exposed. Thus, according to the arrangement of each storage unit, it is common for one storage unit to be subjected to stronger temperature variations than others. This storage unit therefore has a short service life in comparison with the other storage units.

When a single storage unit is defective, it is then simpler to replace all the storage units at the same time, despite the fact that the other storage units can still function. This therefore gives rise to unnecessary expense.

SUMMARY OF THE INVENTION

In order to eliminate all of these disadvantages, the invention proposes an electrical supply device of the type previously described, wherein firstly the tray is made of a heat-conducting material, such as to conduct the heat emitted by the storage unit from the inner surface to the outer surface of the wall of the said receptacle, and secondly the tray is divided up into a plurality of receptacles which are each designed to accommodate at least one storage unit, the wall of each receptacle being made of the said heat-conducting material, characterised in that a conduction layer which is made of a heat-conducting glue or a heat-conducting resin is interposed without play between the storage unit and the inner surface of the wall of the associated receptacle, such as to conduct the heat emitted by the storage unit directly to the inner surface of the wall of the receptacle.

By means of the invention, the temperature of the energy storage units is homogenised, and the heat is discharged well.

The heat-conducting resin or the heat-conducting glue do not change state, contrary to a heat-regulating material such as paraffin, which changes state (solid-liquid) without simultaneously changing temperature.

Paraffin, which in general is the heat-regulating material, is used to store the heat and limit overheating to around a temperature which varies slightly.

The resin or glue, as applicable, and the heat-conducting tray according to the invention are used to limit the overheating to around a temperature which varies over a wider range. The solution according to the invention makes it possible to discharge the heat better, and is therefore more reliable.

In addition, the paraffin is liquefied when it changes state, such that special spacers must be provided, such as resilient collars as described in document FR 2 883 670, between the energy storage units and/or the receptacles.

By means of the invention these spacers are eliminated, since the resin or the glue according to the invention remains in the solid state, and is used to wedge the energy storage units.

The solution according to the invention thus makes it possible to decrease the number of parts, and is therefore simple and economical.

According to other characteristics of the invention taken in isolation or in combination:
  the said heat-conducting resin and the said heat-conducting glue are electrically insulating;
  the said heat-conducting resin is injected between the storage unit and the wall of the receptacle;
  the heat-conducting resin hardens after being injected, such as to wedge the storage unit in the receptacle;
  the hardened heat-conducting resin is resiliently deformable;
  the hardened heat-conducting resin is flexible;
  the hardened heat-conducting resin is adhesive;
  the receptacles are dividing walls;
  each receptacle comprises an individual wall, such that the outer surfaces of the receptacles form the outer surface of the tray;
  the outer surface of the receptacle is undulating;
  the receptacle is blind and the electrical energy storage units are wedged in the base of the blind receptacle, by a layer of heat-conducting glue;
  the glue is electrically insulating;
  the receptacles are oriented vertically and the heat-conducting resin extends along less than 80% of the vertical height of the receptacle;
  the receptacles are oriented longitudinally or transversely, and the heat-conducting resin extends along less than 80% of the vertical height of the receptacle;
  the heat-conducting resin extends generally along 50% of the vertical height of the receptacle;

the thickness of the heat-conducting resin or glue is 2 mm or less;

the thickness of the resin or glue is generally equal to 1 mm;

the receptacle is a receptacle to receive a pair of electrical energy storage units which are arranged in an adjacent manner in the common receipt receptacle which has an oblong form;

the common receptacle is generally in the shape of a numeral "8";

each receptacle is generally in the shape of a half of a numeral "8";

the receptacles are oriented transversely and/or longitudinally, and belong to a closed tray by means of a cover which constitutes a cap for the energy storage units and the tray; and the tray is made of metal.

Other advantages will become apparent in the light of the following description provided in relation to the attached drawings.

DESCRIPTION OF EMBODIMENTS OF THE INVENTION

In the following description, on a non-limiting basis, use will be made of the orientations longitudinal, vertical and transverse indicated by the trihedron "L,V,T" in the figures.

In the following description, identical reference figures designate parts which are identical or have similar functions.

Figure 1:
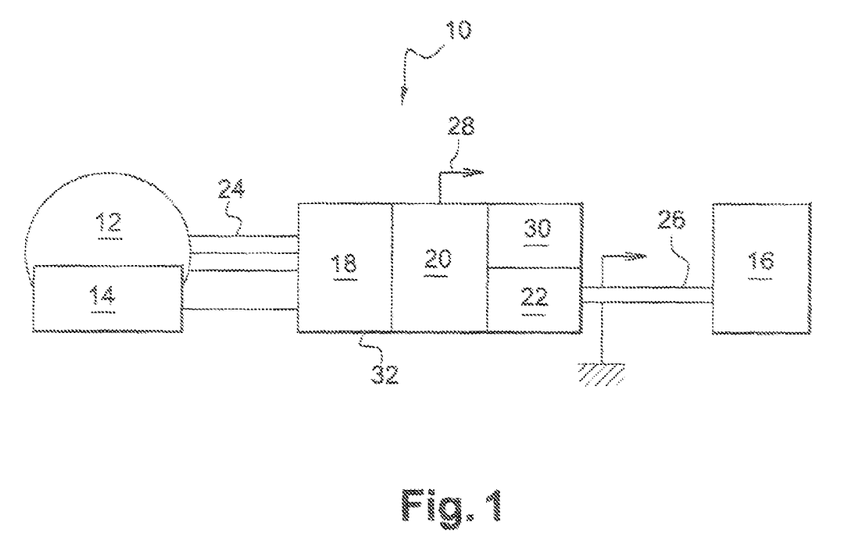
FIG. 1 is a skeleton diagram of an electrical supply device according to the invention.

FIG. 1 shows the assembly of an electrical supply device 10 for a motor vehicle, produced according to the invention.

The device 10 is designed to connect at least one rotary electrical machine 12 to at least one battery 16 of the motor vehicle. The machine 12 is provided with sensors 14, and can function as an electric motor, for example in order to start the thermal engine, or to drive at least one wheel of the vehicle, and/or it can function as an electric generator, for example in order to recuperate the kinetic energy of the vehicle during braking. This machine, which is known as an alternator-starter, is reversible. This machine is taken as a non-limiting example for the remainder of the description.

It should be remembered that an alternator-starter is a reversible alternator, which firstly makes it possible to transform mechanical energy into electrical energy when it is functioning in electrical generator mode, in particular in order to re-charge at least one battery and/or to supply the consumers of at least one motor vehicle on-board network, and secondly to transform electrical energy into mechanical energy when it is functioning in electric motor mode, known as starter mode, in particular in order to start the internal combustion engine or thermal engine of the motor vehicle, and, according to one embodiment, to prevent the thermal engine from stalling, or to drive at least one wheel of the vehicle.

This alternator starter comprises current rectifier means which belong to an inverter comprising branches. These rectifier means are fitted in the branches of the inverter, and consist for example of transistors of the MOSFET type which are controlled by an electronic command and control unit, as described for example in documents FR A 2 745 444 and FR A 2 745 445.

This electronic command and control unit receives signals obtained from sensors 14 for the angular position of the rotor of the machine, and also comprises so-called drivers, which are power elements, and control the transistors of the MOSFET type. According to one embodiment, these drivers belong to a power stage which also comprises the transistors of the MOSFET type of the inverter, thus constituting a so called AC/DC reversible alternating—direct current electric converter, in electric generator mode. In electric motor mode, the MOSFET transistors of the inverter are controlled on an all-or-nothing basis, in order to command in full wave the windings of the stator of the machine, or, as a variant, by means of command with variable pulse widths, i.e. using chopping technology which is known as PWM (pulse width modulation).

The control elements belong to a control stage with lower power.

According to one embodiment, the power stage comprises an electronic power board which bears the power elements, such as the transistors of the MOSFET type and the drivers, and the control stage comprises an electronic control board which bears the control elements.

In these aforementioned documents, the alternator-starter is polyphase. According to one embodiment, as described in documents WO-A-02/08.334 and WO-A-03/088.471, the alternator starter belongs to an arrangement for a motor vehicle comprising at least two electrical energy storage units. One of these storage units is a battery, and the other one is a super capacitor, i.e. a capacitor with a high value known as an ultra capacitor.

In document WO 02/080334, the electric supply device is designed to connect the rotary electrical machine to two batteries which belong to on-board networks with different voltages.

In this case, the ultra capacitor comprises a plurality of ultra capacitor elementary energy storage units, as described hereinafter. It will be noted that in starter mode (functioning in electric motor mode), the arrangement makes it possible to supply the alternator-starter with a voltage which is higher than that in generator mode.

This type of arrangement makes it possible to recuperate energy during the braking, and comprises two electrical distribution networks, at least one switch or a circuit with two switches, and a direct/direct converter, known as a DC/DC converter, which makes it possible to convert voltages, and to function at two different voltages.

For further details, reference will be made to these documents, in the knowledge that the inverter is an electronic current converter.

It will be appreciated that the arrangement may use a rotary electrical machine such as a simple alternator, which is connected electrically to a battery.

According to one embodiment, this alternator is associated with a starter which is fitted in parallel with the alternator, between a first terminal which is connected to earth, and a second terminal which is connected to a circuit, which, in one embodiment, makes it possible to put two batteries in series, for example 12V batteries, in order to supply the starter with 24 V when starting, and to put these two batteries into parallel after the motor vehicle has been started.

The device 10 thus comprises at least one electronic converter 18, 22 and one electrical energy storage unit 20 with an ultra capacitor. This device comprises two electrical networks, one which is dedicated to the power (the storage units 20 being in series), and is designed for the recuperation of energy, and the other one being dedicated to the energy, in particular in order to recharge the battery 16 which is connected to the on-board vehicle network, and/or to supply this on-board network.

According to a first non-limiting embodiment, the device 10 comprises a direct/direct voltage converter 22.

According to a second non-limiting embodiment, the device 10 comprises an inverter 18. The inverter is a reversible DC/AC converter. It functions as an AC/DC converter when the machine is in electric generator mode (it is often known as a rectifier bridge), and as a DC/AC converter when the machine is in electric motor mode.

According to a third non-limiting embodiment, the device 10 comprises an inverter 18 and a direct/direct converter 22.

According to a fourth embodiment in the non-limiting example which is shown in FIG. 1, the device 10 comprises three electronic converters, i.e. an inverter 18, a direct/direct converter 22, and in addition a two-position switch 30 or two switches 30, which are connected to one another by means of power connections such as bus bars (not shown).

In the above-described manner, the inverter 18 is a so-called AC/DC reversible alternating/direct current electric converter in electric generator mode, or a so-called DC/AC direct/alternating converter in electric motor mode.

The direct/direct converter 22 makes it possible in particular to convert a voltage on the energy storage unit side 20, the said voltage being situated in a range of values, in this case in a non-limiting manner, between 6 V and 35 V, into a voltage which is compatible with that of the battery 16, the battery supplying an on-board network of, for example, approximately 12 Volts.

The two-position switch 30 or the two switches 30, for their part make it possible to determine the functioning mode of the electrical machine 12.

In the example taken, the generator mode comprises two phases, i.e. a so-called alternator phase, and a so-called energy recuperation phase, and the motor mode comprises a starting and a dynamic assistance phase.

The functioning mode of the machine with a two-position switch is as follows:

the switch connects the inverter 18 and the storage unit 20 in the motor mode, and in the energy recuperation phase; and the switch connects the inverter 18 and the battery 16 in the alternator phase.

It will be noted that in another embodiment there is no switch.

For this purpose, the device 10 is connected by cables 24 to the electrical machine, by cables 26 to the battery, and by cables 28 to an electric supply network of the vehicle.

Since the device 10 makes it possible to recuperate the kinetic energy of the vehicle by means of the electrical machine, this architecture is known more particularly by the name of "14+X" architecture.

As shown in FIG. 1, the device 10 comprises a single housing 32, in which there are provided the electronic converter(s) 18, 22 and the electrical energy storage unit(s) 20, in particular in order to reduce the lengths of the connections between these elements, such as to limit the effect of the connection inductances.

For further details, reference will be made for example to document FR 2 883 670, and in particular to FIG. 5 of the latter, which shows in perspective the single housing comprising a lower tray, which receives the energy storage unit(s) and an upper part, which forms a cover for the lower tray, and receives the electronic converter(s). As a variant, the electronic converter(s) is/are offset, such that the upper part can be simplified. According to one embodiment, this upper part can consist of a plate with fins, as shown in FIG. 5 of application FR 2 883 670. In general as can be seen in FIGS. 2 to 5, the housing 32 comprises a lower part 34, which forms a tray 34 to receive one or a plurality of electrical energy storage units 20.

In the example represented in FIGS. 2 to 5, the tray 34 comprises twelve energy storage units 20 which are fitted in series.

The units 20 are in this case ultra capacitors, which are also known as "super capacitors".

These ultra capacitors are discharged and recharged faster than a conventional battery, in the manner described for example in the aforementioned document WO 02/080334. It will be appreciated that, as a variant, at least some of these units 20 are batteries which have the same form and size as the ultra capacitors.

Figure 2:
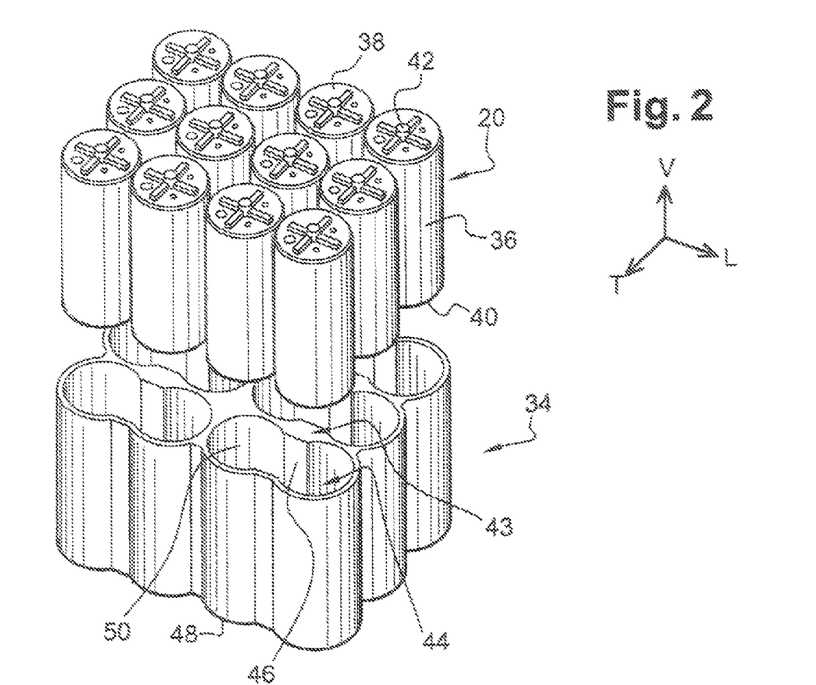
FIG. 2 is an exploded perspective view which represents a tray produced according to the teaching of the invention, as well as the storage units which are designed to be received in the tray.

The storage units 20 have an identical appearance. Each unit 20 thus has a cylindrical form with a vertical axis. Each unit 20 is delimited laterally by an outer cylindrical surface 36 and vertically by an upper circular horizontal end surface 38, and by a lower end circular horizontal end surface 40. Each unit 20 has two electrical connection terminals 42. Each terminal 42 projects vertically, respectively relative to the surface 38 and to the surface 40.

The tray 34 has a generally parallelepiped form with a generally rectangular cross-section. This tray 34 is open at the top in the manner described hereinafter, and is closed at the base by a flat lower horizontal wall 48.

This tray is delimited laterally by undulating outer vertical surfaces 51, which match the forms of the storage units 20. The surfaces 51 are perpendicular to the flat lower horizontal wall 48 which constitutes the base of the tray 34.

According to one embodiment, the lower wall 48 comprises in a projecting manner perforated lugs or eyelets (not shown) for securing of the tray 34 to a fixed part of the vehicle, such as a cold part of the bodywork of the vehicle, by means of securing units such as screws, rivets or bolts which pass through the holes in the lugs or eyelets.

In this case, the upper part of the housing 32 is not shown, in order to be able to see the units 20. This upper part constitutes a cover for closure of the top of the tray 34.

The tray 34 comprises at least one receptacle 44 to receive at least one ultra capacitor electrical energy storage unit 20. In the example represented in FIG. 2, the tray 34 is divided up into six receptacles 44 with an identical appearance, each of which can receive a pair of ultra capacitor energy storage units 20. The two storage units 20 of each pair are longitudinally adjacent, and, according to one characteristic, are thus received in a receptacle 44 with common vertical orientation. These receptacles 44 have an oblong form.

The terminals 42 of the lower end surfaces 40 of the storage units 20 of each pair are connected together electrically by means of a bar 45 made of an electrically conductive material such as copper, as illustrated in FIG. 5. Bars, not shown, also connect the terminals 42 of the upper surfaces.

The bars are arranged such as to connect in series the units 20, which thus have an input and output terminal.

The position of the input and output terminals depends on the applications.

Each receptacle 44 comprises an upper opening 50, which makes it possible to introduce the pair of electrical energy storage units 20 by means of vertical displacement towards the closed base. Each receptacle 44 is closed at the bottom by a horizontal inner base formed by the flat horizontal lower wall 48.

Figure 3:
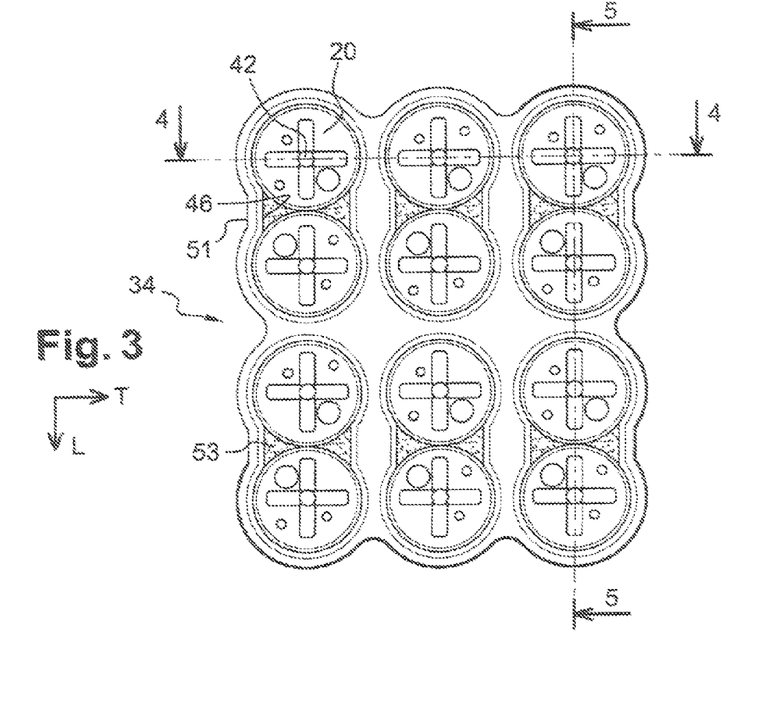
FIG. 3 is a plan view which represents the storage units received in the tray in FIG. 3.

As represented in FIG. 3, the horizontal cross-section of each receptacle 44 is generally in the form of a numeral "8".

More specifically, each receptacle 44 of a pair of adjacent units 20 is delimited by a lateral wall 43 with a lower surface 46 with an oblong form, which in this case is generally in the form of a numeral "8". This lower surface 46 has (FIGS. 2 and 3) two circular portions which are connected to one another by two central portions with flat surfaces opposite one another. The central portions are each connected to the ends of the circular portions, which extend over more than 180°, as can be best seen in FIG. 3.

The flat surfaces of the central portions have a generally rectangular form, and vertically have a dimension which is larger than their longitudinal dimension, as can be seen in FIG. 2. Each receptacle 44 is thus narrower at the level of the flat surfaces of the opposite central portions.

The circular portions have dimensions such that they can each receive a unit 20. Their size is thus defined by the diameter of the outer surface 36 of a unit.

Thus, as can be seen in FIG. 3, each receptacle 44 with an oblong form has a longitudinal length which is substantially equal to twice the diameter of each storage unit 20, and a transverse width which is substantially equal to the diameter of a storage unit 20.

Figure 4:
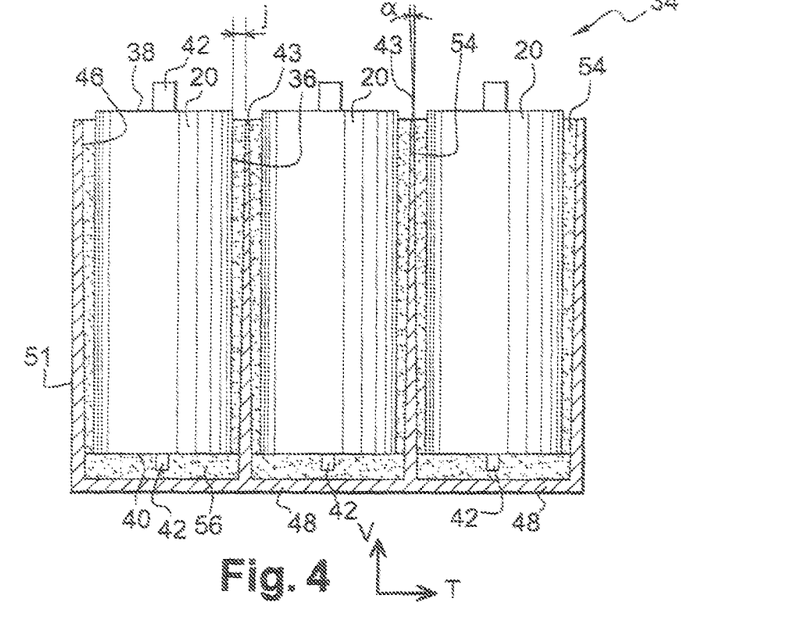
FIG. 4 is a view in cross-section according to the cross-sectional plane 4-4 in FIG. 3.
Figure 5:
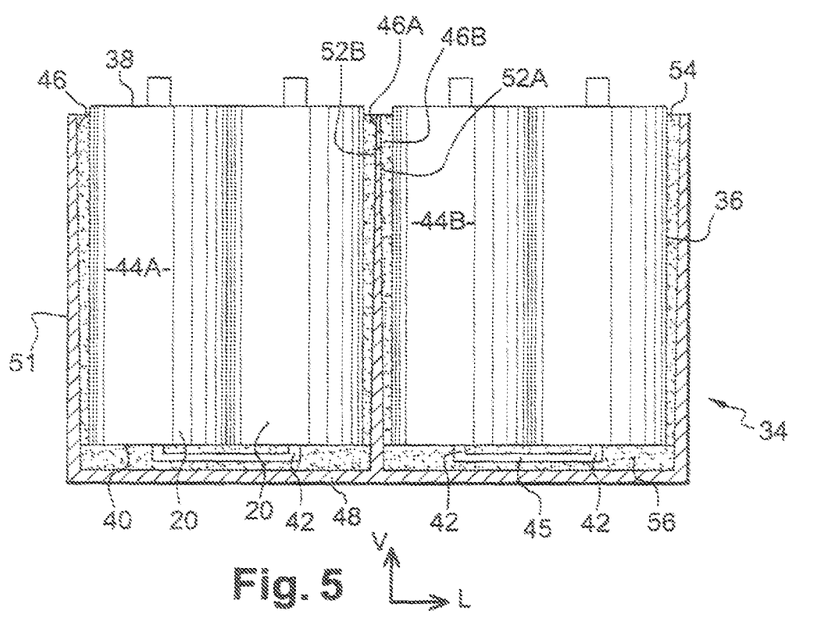
FIG. 5 is a view in cross-section according to the cross-sectional plane 5-5 in FIG. 3.

As can be seen in FIG. 4, the cylindrical surface 36 of each storage unit 20 is thus arranged at least partly in the vicinity of the inner lateral surface 46 of the associated receptacle 44, with lateral insertion play T.

The lateral walls 43 are delimited externally partly by the vertical outer surfaces 51, and partly, in the manner described hereinafter, by the material which is present between two adjacent receptacles 44. The thickness of each wall 43 is substantially identical for each receptacle 44. The thickness of the lateral walls 43 is relatively slight at the level of the surface 51, such as to assist the exchanges of heat between the interior and the exterior of the tray 34.

The thickness of the walls 43 is greater between two adjacent receptacles 44, as can be seen in FIG. 3.

As is apparent from the description and the drawings, each receptacle 44 has a blind form, and thus comprises an upper opening 50, which makes it possible to introduce the storage units 20 by means of vertical displacement downwards.

The receptacles 44 are arranged in longitudinal pairs on three transverse rows. Each row comprises four units 20. This arrangement is compact, and the tray can thus have dimensions similar to those of a vehicle battery.

The receptacles are dividing walls 44, i.e. at least part of the lateral wall 43 forms a common partition for two adjacent receptacles 44. Thus, as illustrated in FIG. 5, part of the outer surface 52A of a given receptacle 44A can constitute the inner surface 46B of an adjacent receptacle 44B.

The outer surface of the parts of lateral walls 43 which are not dividing walls forms an outer surface 51 of the tray 34.

As represented in FIGS. 3 and 5, the two storage units 20 of a pair are tangent in a vertical contact line. Thus, in each receptacle 44, there is longitudinal play 53 between two opposite portions of the cylindrical surfaces 36 of each pair of storage units 20 on both sides of the contact line. This contact line makes it possible to obtain a more homogeneous temperature of the units 20 of a single pair.

As a variant, the contact line is eliminated, such that slight play exists.

During charging and discharging operations, each storage unit 20 emits a strong flow of heat from its upper 38 and lower 40 end surfaces, as well as from its cylindrical surface 36.

In order to permit rapid discharge of the heat produced by each storage unit 20, and in order to permit homogeneous heating of all the storage units 20 received in the tray 34, according to one characteristic the tray 34 is made of a heat-conducting material, such as to conduct as rapidly as possible the heat produced by each storage unit 20, from the inner surface 46 to the outer surface of the lateral wall 43 of the associated receptacle 44.

According to one embodiment, the tray 34 is made in a single piece from a single heat-conducting material. According to one embodiment, this material is a material which can be moulded, such that the tray is rendered integral by moulding.

According to one embodiment, the tray 34 is made of metal.

In the example given, this tray 34 is based on aluminium, in order to reduce its weight and to obtain a tray which is rendered integral by being moulded.

As a variant, the tray is based on magnesium, for example it is made of a magnesium and aluminium alloy.

As represented in FIGS. 4 and 5, in order to be able to insert each storage unit 20 vertically in the associated receptacle 44, and/or because of constraints which are inherent in the manufacturing of the tray 34, the inner surfaces 46 of each receptacle 44 have a clearance angle "α" relative to the vertical direction, such that the inner surfaces 46 converge towards the base 48 of the receptacle 44. This clearance angle also makes it possible to obtain the tray in a single piece by moulding.

Thus, the lateral play "j" between the cylindrical surface 36 of each storage unit 20 and the inner surface 46 of the associated receptacle 44 is formed. The layer of stagnant air which is thus interposed between the cylindrical surface 36 of each storage unit 20 and the inner surface 46 of the associated receptacle 44 acts as a thermal insulator.

In order to solve this problem, a conductive layer 54 made of a substance which has heat-conducting properties is interposed radially, without play, between the cylindrical surface 36 of the storage unit 20 and the inner surface 46 of the associated receptacle 44.

The conductive layer 54 thus advantageously fills the longitudinal play 53 which exists between the storage units 20 of a pair. According to one embodiment, the conductive layer is electrically insulating.

According to one characteristic of the invention, this heat-conducting layer 54 which is interposed radially without play between the cylindrical surface 36 of the storage unit 20 and the inner surface 46 of the associated receptacle 44 consists of a heat-conducting resin or a heat-conducting glue.

According to one embodiment, this heat-conducting glue or this heat-conducting resin is electrically insulating.

The said heat-conducting resin is originally in a liquid or viscous form. It is injected between each storage unit 20 and the inner surface 46 of the associated receptacle 44 by filling of the receptacle 44 after the storage units 20 have been arranged. Thus, the said heat-conducting resin is interposed between the two storage units 20, such that the two adjacent storage units 20 of a pair are at the same temperature.

Advantageously, the heat-conducting resin 54 forms a heat-conducting layer which hardens after it has been injected, such as to wedge the storage unit 20 in the receptacle 44 laterally, i.e. longitudinally and transversely. According to one embodiment, the hardened conductive layer 54 is resiliently deformable, so as to absorb any impacts.

This heat-conducting resin is therefore flexible. It is used to wedge the units 20.

In order to facilitate the operation of injection of the heat-conducting resin, the storage units 20 can previously be glued and wedged at the base 48 of the associated receptacle 44 by means of a layer of glue 56. In fact, when the storage units 20 are not wedged, they are balanced unstably on the associated bar 45, as shown in FIG. 5.

The glue which is used in order to form the layer of glue 56 is preferably an electrical insulator.

Advantageously, the layer of glue 56 is made of a material which has thermally conductive properties.

During the assembly, the layer of glue 56 is firstly applied to the base 48 of each receptacle 44. Then, the pairs of storage units 20 are inserted vertically through the upper opening 50 in the associated receptacles 44.

Then, the heat-conducting resin is injected into each receptacle 44, such as to form the conductive layer 54. The thickness of this layer of heat-conducting resin is advantageously 2 mm or less, in order to be able to discharge the heat better in combination with the heat-conducting tray 34. According to one embodiment, this thickness is generally equal to 1 mm.

The heat-conducting glue 56 is also used to secure the storage unit 20 to the tray 34.

The glue 56 also makes it possible to reduce the quantity of resin 54. In fact, in FIGS. 4 and 5, the resin extends along the entire height of the receptacle 44. As a variant, by means of the glue 56, the resin can extend along less than 80% of the vertical height of the receptacle, for example over 50% of the height of the receptacle 44. The same applies in the second embodiment in FIGS. 6 and 7. It will be appreciated that the shape of the receptacle 44, which is generally in the form of a numeral "8", makes it possible to reduce the quantity and therefore the volume of heat-conducting resin 54 used.

As a variant, the layer 54 of heat-conducting resin is replaced by glue of the same type as the glue 56.

As a variant, the layers 54 and 56 are produced by means of a heat-conducting resin which has adhesive properties.

Once it has hardened, this resin becomes adhesive.

In the aforementioned manner, a resin has been selected which, once it has hardened, has properties of adhesion, flexibility and resilient deformation, in order to deaden impacts.

Advantageously, the heat-conducting resin thus hardens such as to have a solid and resilient consistency.

In general, the resin or glue according to the invention make it possible to provide insulation which permits avoidance of penetration by water or any other impurity.

During operations of charging and discharging of the storage units 20, the flow of heat emitted by each storage unit 20 through its cylindrical surface 36 is conducted directly and rapidly via the conductive layer 54 to the inner surface 46 of each receptacle 44. The heat is then conducted to the outer surface of the associated wall 43.

Thus, part of the heat is conducted directly to the exterior of the tray 34 via the outer surface 51 of the tray 34, whereas another part of the heat is conducted to the other receptacles 44 by the lateral walls 43 which form partitions.

The device produced according to the teaching of the invention thus makes it possible to obtain an instantaneous temperature which is substantially homogeneous for all the storage units 20 which are provided in the tray 34, and all the storage units 20 thus have substantially the same service life.

In addition, the heat which is emitted by all the storage units 20 is transmitted directly or indirectly by conduction to the outer surface 51 of the tray 34.

Advantageously, the outer surface 51 of the tray 34 is connected thermally to cooling means such as a current of cool air, a heat pipe, or any other suitable cooling means.

Figure 6:
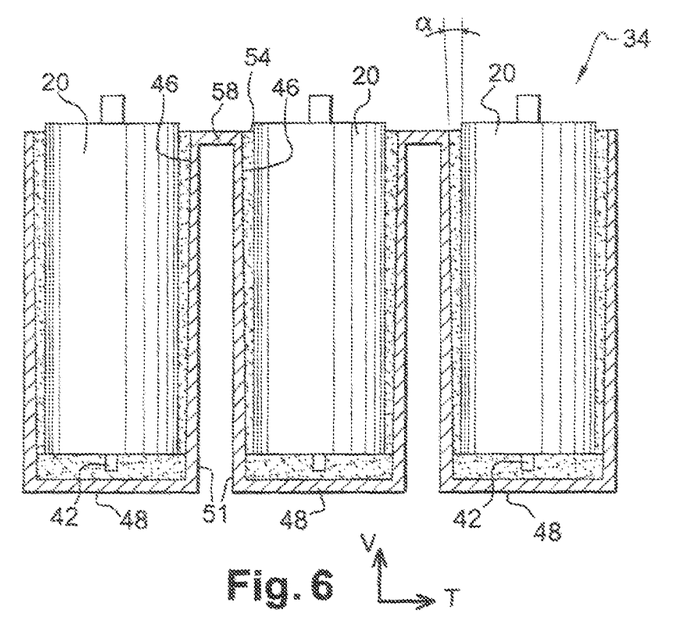
FIG. 6 is a view similar to that of FIG. 4, which represents the tray produced according to a second embodiment of the invention.
Figure 7:
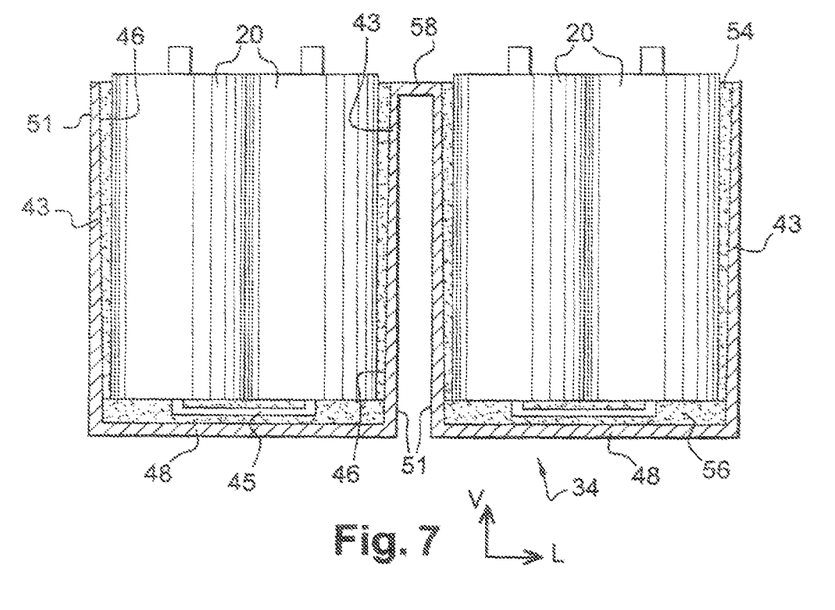
FIG. 7 is a view similar to that of FIG. 5, which represents the tray produced according to a second embodiment of the invention.

According to a second embodiment of the invention which is represented in FIGS. 6 and 7, the tray 34 has an appearance and structure similar to that described in the first embodiment of the invention.

However, the receptacles 44 are not dividing walls, i.e. each receptacle 44 is delimited laterally by an individual lateral wall 43.

The outer surfaces of the individual lateral walls 43 of each receptacle 44 thus form the outer surfaces 51 of the tray 34. The outer surfaces 51 of the lateral walls 43 of each receptacle 44 are thus spaced laterally from one another, such that the heat which is emitted by the storage units 20 in a receptacle 44 is conducted directly to the exterior of the tank 34 without passing via the adjacent receptacles 44.

The tray 34 comprises an upper plate 58, from the lower surface of which the receptacles 44 extend vertically downwards. The upper openings in each receptacle 44 are formed in the plate 58 of the tray 34.

The tray 34 is produced in a single piece, for example by means of an extrusion process, which consists of thrusting vertically downwards with a piston oblong areas of a horizontal aluminium plate which is made ductile by heating, in order to form the receptacles 44.

In this embodiment, as in the preceding one, a conductive layer 54 is interposed between the cylindrical surface 36 of each storage unit 20 and the inner surface 46 of each receptacle 44. A layer of glue 56 is also provided in order to glue the units 20 to the base 48 of the tray 34.

The tray 34 according to the second embodiment of the invention thus makes it possible to increase the cumulative area of the outer lateral surfaces 51, such as to discharge even more quickly the heat produced by the storage units 20.

Figure 9:
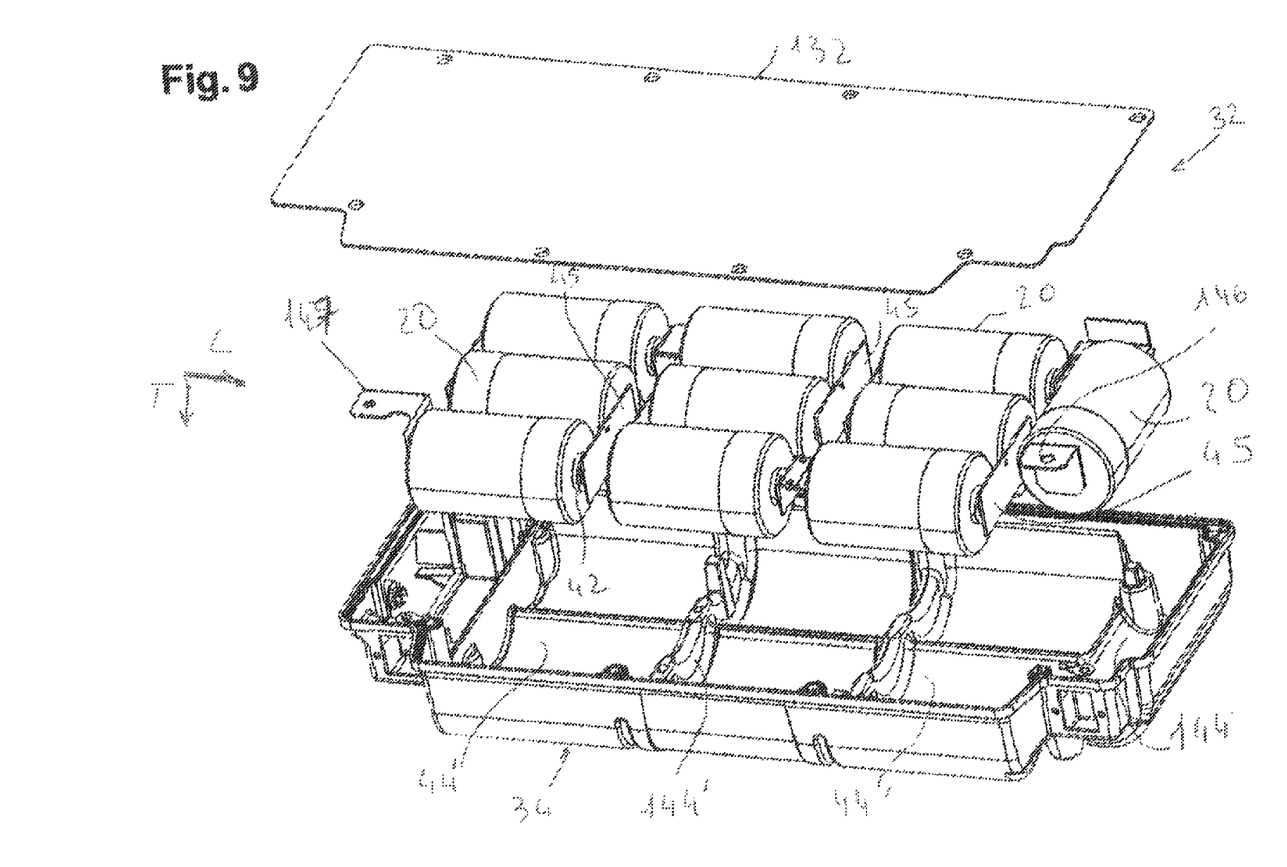
FIG. 9 is an exploded perspective view of a housing according to a fourth embodiment of the invention.

According to a third embodiment of the invention which is represented in FIG. 9, the device comprises three pairs of adjacent storage units 20.

There is a single housing 32, and this therefore constitutes the tray for receipt of the units 20. A single hollow part is therefore provided for formation of receptacles 234 with an oblong form for the units 20. The units 20 are introduced transversely into the receptacles 234. These receptacles have a longitudinal orientation, with heat-conducting resin or heat-conducting glue 54 being interposed between the inner surfaces of the receptacles 234 and the outer surfaces of the units 20. According to one embodiment, the housing is made of aluminium. As a variant, the housing is made of copper.

The inner receptacles 234 with an oblong form are delimited by two portions with a semi-circular form and by two straight portions which connect the circumferential ends of the semi-circular portions to one another.

According to this embodiment, which is applicable to all the embodiments previously described, the outer surfaces of the housing 32 and thus of the tray, comprise projecting units such as fins 60 or pins, represented in broken lines, such as to increase the heat exchange surface between the interior of the housing 32 and the exterior of the housing 32. 135 shows lugs for securing the housing 32 to a fixed part of the vehicle, such as the bodywork of the latter.

These lugs are perforated for securing of the housing 32 for example to the bodywork of the vehicle by means of securing units such as screws, bolts or rivets.

Figure 10:
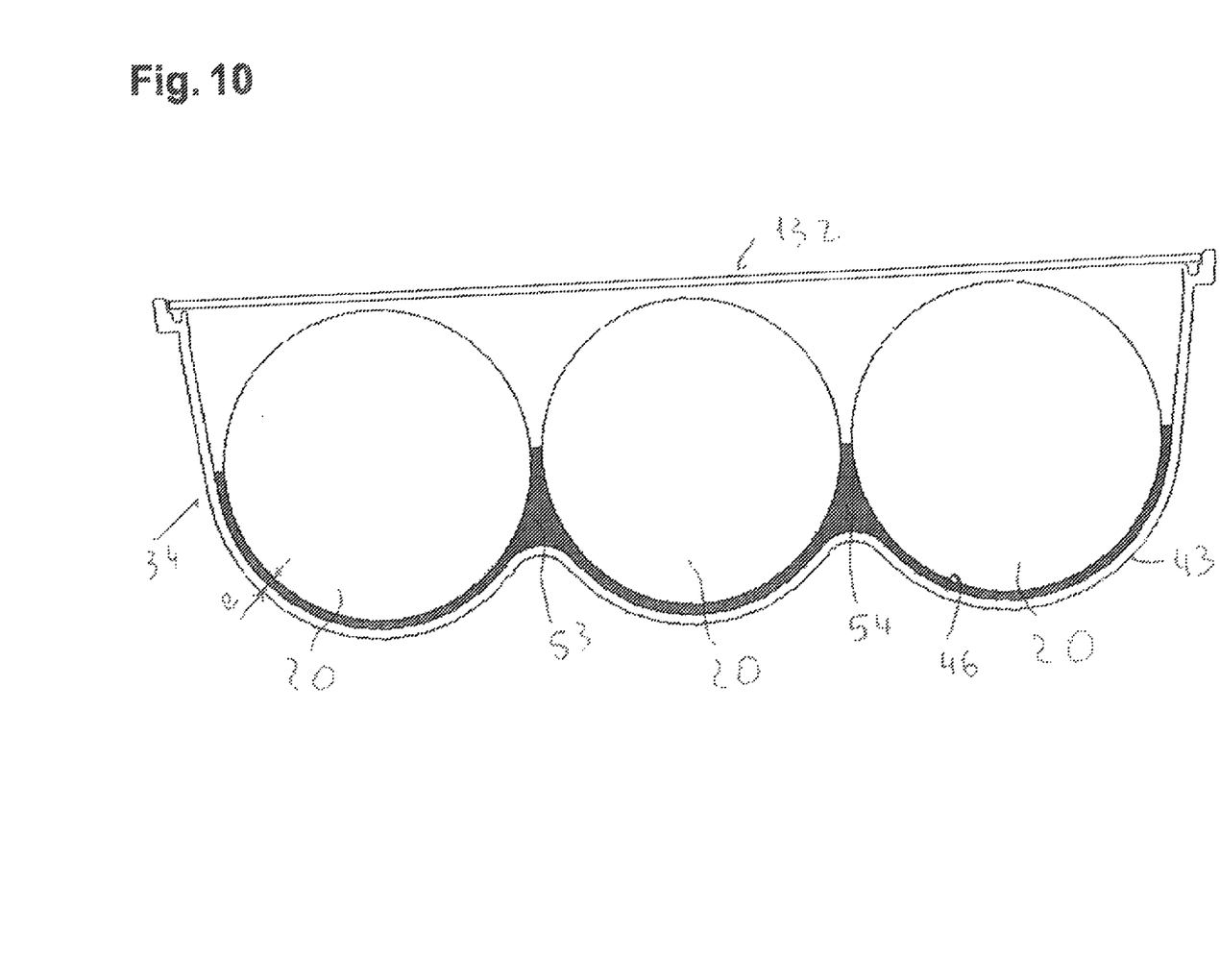
FIG. 10 is a view in transverse cross-section of the housing in FIG. 9.

In the embodiment in FIGS. 9 and 10 the energy storage units 20 are implanted partly longitudinally and partly transversely.

In this embodiment the housing 32 comprises a hollow tray 34 with a longitudinally undulating base for creation of nine longitudinal receptacles 44' for fitting of nine units grouped in threes. These receptacles 44' are delimited by transverse partitions 144', as can be seen better in FIG. 9.

These partitions 144' are hollow centrally for passage of the terminals 42 of the units 20 concerned. As in the preceding figures, the terminals of the units 20 are connected to one another in particular by conductive bars 45, in order to put the units in series between two terminals 146, 147.

Each receptacle 44' comprises a base which constitutes a portion of a cylinder.

Another unit 20 is also provided at one of the ends of the tray 34. For this purpose, this tray 34 has a transverse receptacle 144 in the image of the receptacles 44', but perpendicular to the latter.

A layer of heat-conducting resin 54 is interposed without play between each unit 20 and the inner surface 46 of the wall 43 of the associated receptacle 44', 144, as in the preceding figures.

The units are not in contact with one another, as can be seen better in FIG. 10. In the above-described manner, the thickness e of the resin at the level of the wall 43 is less than 2 mm, in order to conduct the heat better. In this case the thickness is equal to 1 mm.

In an economic manner, the resin extends over less than 80% of the vertical height of the tray 34 with an undulating base. In this case it extends generally over 50% of the vertical height of the bulging tray 34 towards the exterior, as can be seen in FIG. 10. This tray 34 has at its free end and on its periphery an additional thickness without a reference, which is configured so as to form an edge to receive a flat cover 132 for closure of the tray.

This additional thickness has a receptacle without a reference for fitting of a seal, not shown. This seal is pressed by the cover 132, which is perforated locally for insertion of securing units, such as screws, to fix the cover 132 to the tray 34.

The heat-conducting resin, which in this case is electrically insulating, is selected so that, after it has hardened, it has properties of adhesion and resilient deformation.

This resin is flexible and also impermeable. The units 20 are thus secured in the tray 34, and are wedged by the adhesive resin.

The cover 132 for closure of the tray 34 constitutes a protective cover for the units 20.

The tray 34 is for example based on aluminium, and the cover 132 is based on sheet metal. The tray is for example obtained by being moulded, By means of the resin 54, the assembly 34, 132, 20 can be handled and transported. The same applies to the other embodiments.

Figure 11:
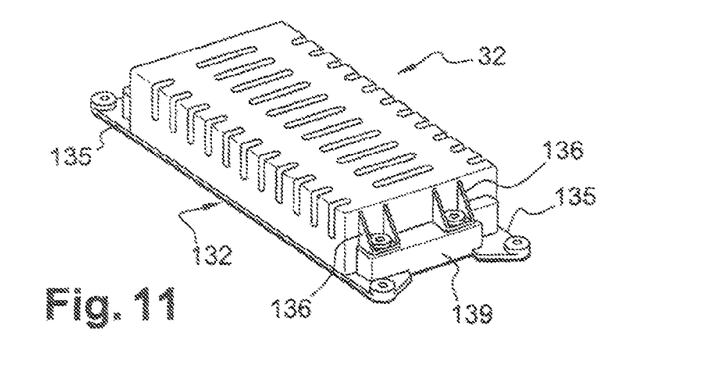
FIG. 11 is a perspective view of a housing according to a fifth embodiment of the invention.
Figure 12:
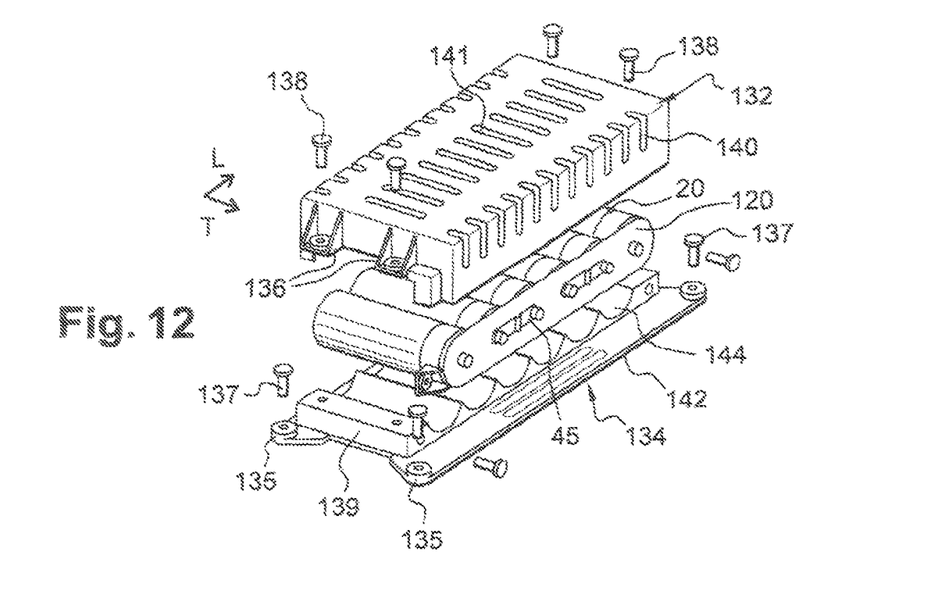
FIG. 12 is an exploded perspective view of the housing in FIG. 11.
Figure 13:
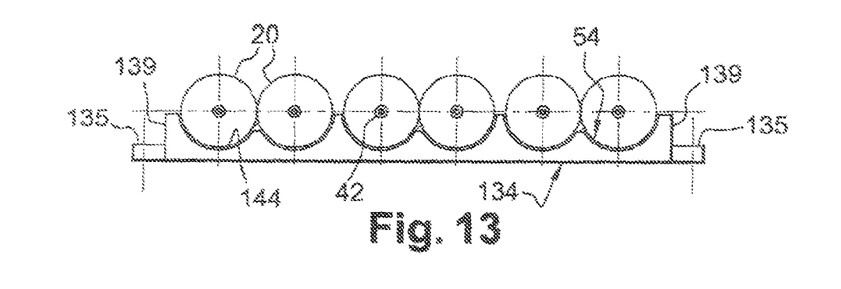
FIG. 13 is a front view of the support tray for the electrical energy storage units in FIG. 12.

In the embodiment in FIGS. 11 to 13, the housing 32 comprises a tray 134 for receipt of the electrical energy storage units 20, which is relatively flat, and is covered entirely by a cover 132 with a hollow form which constitutes a cap for the units 20 and the tray 134, as can be seen in FIG. 11. In this embodiment the cover 132 has a base with a rectangular form which is delimited by a lateral edge perpendicular to the base. This lateral edge comprises two longitudinal lateral walls and two transverse lateral walls. This cover 132 is in this case made of aluminium. The base and the longitudinal walls of the edge of the cover 132 are provided with openings 141, 40, respectively, in order to discharge the heat better. In this embodiment, the housing 32 is fitted for example in the boot or the passenger space of the vehicle.

The transverse lateral walls of the edge of the cover are each provided with two ribbed lugs for securing of the cover 132 to a transverse lateral upright 139 of the tray, by means of screws 138 which are in screwed into a threaded hole in the upright 139.

In this case the tray 134 comprises receptacles 144 to receive units 20. The receptacles 144 have a transverse orientation.

The receptacles 144 are configured to receive a pair of storage units 20 as in the first embodiment. These receptacles are delimited by two generally semi-cylindrical portions with a size which is suitable for receiving the outer cylindrical surface of the units 20. Each receptacle 144 is generally in the form of a half of a numeral "8". The two units 20 of a single pair are in this case in local contact with one another, according to a transverse line. As a variant, there is no contact as in FIG. 10. A heat conduction layer 54 is interposed radially without play between the inner surface of the receptacle 144 and the outer cylindrical surface of the units 20 of the pair, as in the first embodiment in FIGS. 2 to 5. The layer 54 is for example a heat-conducting resin. The tray is in this case made of aluminium. As a variant, it is possible to use heat-conducting glue, in the above-described manner.

The tray 134 is in the form of a rectangular plate which is hollowed transversely, in this case for formation of three pairs of receptacles 144 to receive three pairs of ultra capacitor units 20.

The tray 134 is for example made of metal. According to one embodiment it is made of aluminium.

This tray 134 is delimited laterally by its two transverse uprights 139 for securing of the cover 132, and it is delimited longitudinally by two cross-members 142. Each cross-member 142 comprises at each of its ends a perforated eyelet 135, each of which is connected to one end of an upright 139.

The uprights 142 make it possible to increase the surface of contact with the source of cold.

As in FIG. 10, the eyelets 135 are eyelets for securing the housing 32 to a part, which in this case is cold, of the vehicle, such as the bodywork of the latter. In this case the securing is carried out by means of screws 137, or as a variant rivets, bolts or studs, which each pass through the hole in an eyelet 135.

FIG. 12 shows the electrical connection bars 45 between the terminals 42 of the units 20, as well as a printed circuit 145 comprising electronic components in order to balance the units 20 when the latter consist of ultra capacitors or super capacitors, so that the latter are charged uniformly electrically.

The units 20, which in this case are connected in series by the bars 45 and the printed circuit 145, form in advance a module 120 which is fitted in the tray 134, and is covered by the protective cover 132.

The protective cover 132 covers and retains the module 120.

As a variant, the cover 132 has receptacles such as the tray 134, the units 20 being sandwiched between the generally semi-cylindrical receptacles, and opposite the tray 134 and the cover 132.

All combinations and variants of the electrical supply device are possible.

Thus, it is possible to carry out rotation by 90°, for example in the embodiment in FIGS. 2 to 5, the base 48 then having a vertical orientation.

As a variant, the tray 134 in FIGS. 11 to 13 has an undulating outer wall, as in FIGS. 2 to 5.

As a variant, the cover 132 in FIGS. 11 to 13 has semi-cylindrical receptacles, like the tray 134.

In this case, the receptacles of the units are in two parts, and generally have a form with dimensions which are adapted to the outer surface of the units 20, in order to receive the latter.

Figure 14:
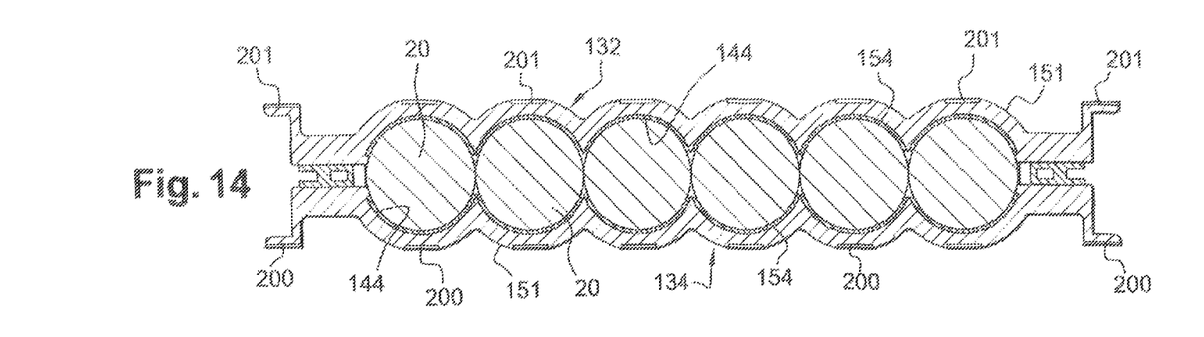
FIG. 14 is a view in cross-section of a housing for a sixth embodiment of the invention.
Figure 15:
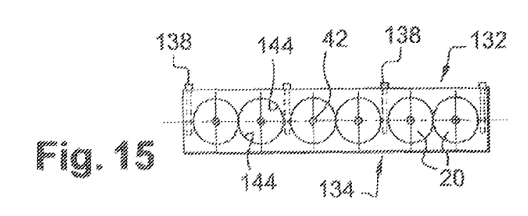
FIG. 15 is a schematic front view for a seventh embodiment according to the invention.

Receptacles of this type are shown in FIGS. 14 and 15.

As a variant, as can be seen in FIG. 14, the tray 134 and the cover 132 are made of heat-conducting material, and each have an undulating outer wall 151, as in FIGS. 2 to 5, as well as receptacles 34 for the units 20.

In comparison with the embodiment in FIGS. 2 to 5, rotation of 90° is carried out, with the walls 151 having transverse orientation.

200 shows the surfaces of partial contact between the outer wall of the tray 134 and a source of cold, such as a cold part of the bodywork of the motor vehicle, 201 shows the surfaces of partial contact between the outer wall of the cover 132 and the air, or a source of cold, and 154 shows the surfaces of contact between the energy storage units 20 and the inner surfaces of the receptacles 144. The outer surface 151 of the receptacles 144 is thus undulating.

According to one embodiment, the surfaces 154 belong to a heat-conducting substance, such as a heat-conducting and electrically insulating resin, as in FIGS. 11 to 13.

As a variant, as shown in FIG. 15, the energy storage units 20 are in contact for example via a heat-conducting glue with the receptacles 144 of the cover 132 and of the tray 134 which is made of heat-conducting material. In this variant, the surface of contact between the tray 134 and the source of cold is provided along the entire length of the tray 134 with a flat outer surface. Similarly, the contact between the outer surface of the cover 132 and the air or the source of cold is provided along the entire length of the cover 132.

It will be appreciated that the length of the contact surfaces depends on the applications.

For example in FIG. 14, at least two surfaces 200 or 201 can be connected to one another, and form only a single surface.

Figure 8:
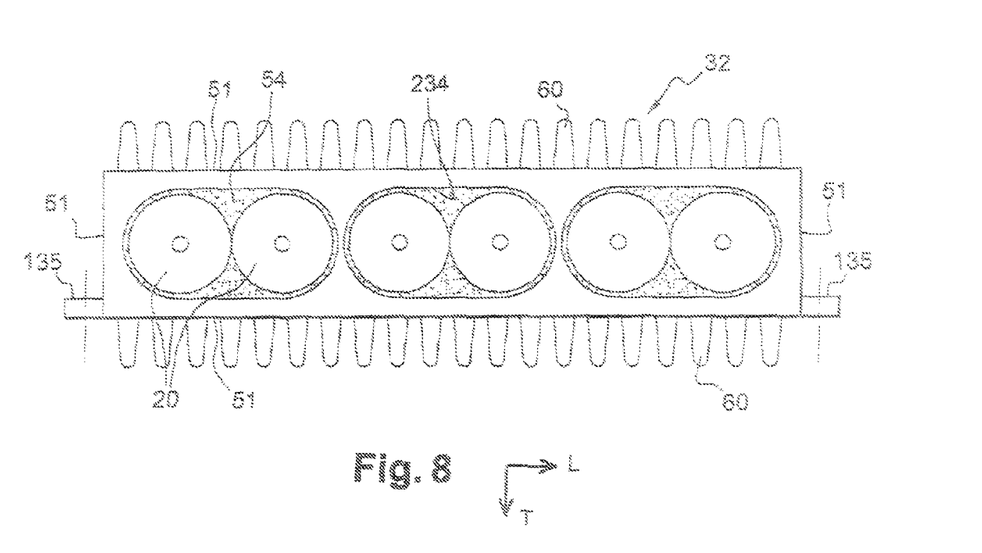
FIG. 8 is a plan view, which represents a tray produced according to a third embodiment of the invention.

It will be appreciated that the surfaces 201 can be equipped with projecting units, as in FIG. 8.

It will be noted that the cover 132 in FIG. 15 is connected to the tray 134 by means of securing units 138 such as screws, which are screwed into the thickness of the material which is present between two receptacles 34. This therefore forms a housing in two parts 132, 134, which form a screw clamp for the units 20, which are thus secured.

It will be appreciated that the number of units 20 depends on the applications, and in particular on the voltage necessary. There may be 6 or 12 of the units, or a number other than 6 or 12. For example, these units can comprise six units 20 with ultra capacitors, and two units 20 in the form of a conventional battery.

Figure 16:
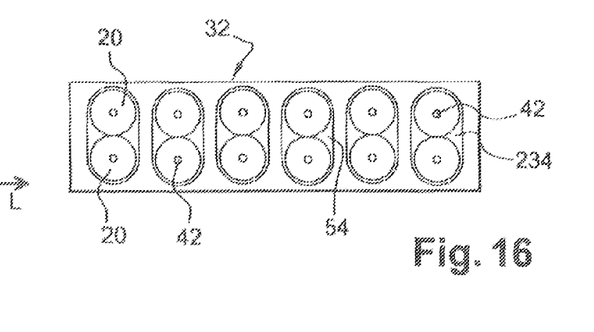
FIGS. 16 and 17 are views similar to FIG. 15 for two variant embodiments of the invention.

In the embodiment in FIG. 10, it is possible to orient the receptacles 234 vertically, and double the number of them, as shown in FIG. 16.

The thickness of the housing 32 is increased, whilst retaining its axial length 32.

Figure 17:
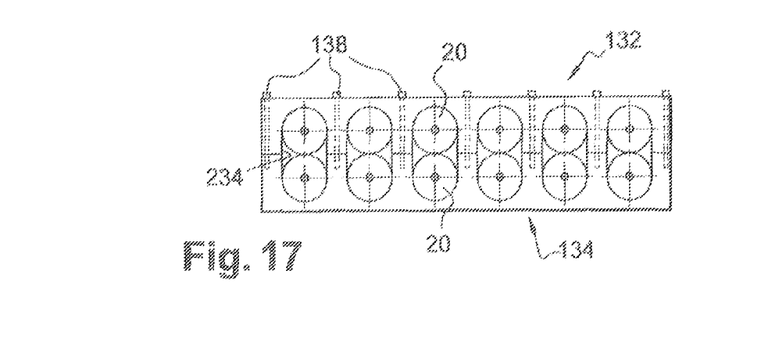

This can be applied to the embodiment in FIG. 15, as shown in FIG. 17.

The housing 32 can be fitted in a protected area, such as the boot or passenger space of the motor vehicle.

It will be appreciated that the units in FIGS. 11 to 15 and the trays in FIGS. 11 to 15 can be oriented vertically.

It will be appreciated that, as a variant, the cross-section of the units 20 can be other than circular. These units 20 have for example an oval or polygonal shape. The same applies to the receptacles for receipt of the units 20.

The receptacles can be oriented horizontally and vertically. For example, the housing in FIG. 16 can receive eight units 20. In this case, the housing comprises two vertical receptacles 234 and two horizontal receptacles.

The units 20 can consist of two groups which are fitted in parallel, with each group comprising units fitted in series.

Thus, by means of the tray 32, 34, 134 produced according to the teaching of the invention, the heat which is produced by the storage units 20 is discharged very rapidly, which prevents a sudden increase in the temperature to above the maximum functioning temperature of the storage units 20.

In addition, the presence of a conductive layer makes it possible to discharge the heat by conduction, by eliminating the areas of stagnant air which impede the passage of the heat.

The units 20 have a homogeneous temperature by thermal conduction, in particular because of the tray made of heat-conducting material.

This tray is in indirect contact with the units 20 and with a source of cold. According to one embodiment, this source of cold is the sheet metal of the vehicle bodywork. As a variant, it can be at least one Peletier effect cell, with a hot lower surface and a cold upper surface in contact with the tray.

As a variant, a current of cold air sweeps projections which are integral with the tray, such as fins of the type in FIG. 10.

The circulation of the current of air is obtained for example by means of at least one fan, which for example is controlled according to the temperature of the units 20.

At least one heat pipe can connect the tray to a source of cold, for example a cold plate.

As a variant, the tray and the cover are made of heat-conducting and electrically insulating material.

It will be appreciated that when the outer surface of the unit 20 is electrically insulating, the tray and the cover in FIGS. 15 and 17 can be made of metal.

When the substance 54 is electrically insulating, the tray can be electrically conductive or electrically insulating. This substance makes it possible to make the temperature of the units 20 of a single pair more homogeneous.

It will be understood that in certain figures, the storage units 20 are fitted in pairs, whilst being in contact with one another, which makes is possible to homogenise better still the temperature of the units 20.

It will also be noted that the receptacles 144 and 234 are dividing walls, and that the lower tray 32, 34, 134 is a tray to support the electrical energy storage units 20.

It will also be noted that the receptacles, which are generally in the form of a numeral "8", have an oblong shape.

By way of example, the resin used can be a resin of the polyurethane type with two components, one of which is a hardener. For example, a two-component resin can be used which is sold by the company RAIGI under the reference RAIGITANE 4759/RAIGIDUR HR, which forms a liquid polyurethane system at ambient temperature. This black-coloured resin is flexible (50 Shore HR) and has excellent resistance to thermal shocks, and very good adhesion to metal and plastic parts. This resin is therefore adhesive.

As a variant, it is possible to use a two-component polyurethane system which is sold by the company WEVO (resin PD4431FL and hardener 300), with Shore hardness of 50-55.

The invention claimed is:

1. An electrical supply device (10) for a motor vehicle, comprising:
    a tray (32, 34, 134) housing a plurality of ultra high-capacity electrical energy storage units (20) each capable of emitting a heat;
    the tray (32, 34, 134) comprising a plurality of receptacles (44, 144, 234) each provided for receiving at least one of the electrical energy storage units (20), each of the receptacles including a wall (43) having an inner surface (46) and an outer surface (51, 52, 151);
    the tray (32, 34, 134) being made of a heat-conducting material, such as to conduct the heat emitted by the storage unit from the inner surface (46) to the outer surface (51, 52, 151) of the wall (43) of each of the receptacles (44, 144, 234);
    the tray being divided by the wall into the plurality of the receptacles (44, 44', 144) each designed to accommodate the at least one storage unit (20), the wall (43) of each of the receptacles being made of the heat-conducting material; and
    a heat conduction layer (54) made of a heat-conducting glue or a heat-conducting resin and interposed without play between the storage unit (20) and the inner surface (46) of the wall (43) of the associated receptacle (44, 144, 234), such as to conduct the heat emitted by the storage unit (20) directly to the inner surface (46) of the wall (43) of the receptacle (44, 144, 234).

2. The supply device (10) according to claim 1, wherein the heat-conducting resin and the heat-conducting glue are electrically insulating.

3. The supply device (10) according to claim 1, wherein the heat-conducting resin is injected between the storage unit (20) and the wall (43) of the receptacle (44).

4. The supply device (10) according to claim 3, wherein the heat-conducting resin hardens after being injected, such as to wedge the storage unit (20) in the receptacle (44).

5. The supply device (10) according to claim 4, wherein the hardened heat-conducting resin is resiliently deformable.

6. The supply device (10) according to claim 4, wherein the hardened heat-conducting resin is adhesive.

7. The supply device (10) according to claim 1, wherein the receptacles (44, 144, 234) are separated by dividing walls.

8. The supply device (10) according to claim 1, wherein each of the receptacles (44) comprises an individual wall (43), such that the outer surfaces (51) of the receptacles (44) form the outer surface (51) of the tray (34).

9. The supply device (10) according to claim 1, wherein the outer surface (51, 151) of the receptacle (44, 144) is undulating.

10. The supply device according to claim 1, wherein the receptacle is blind and the electrical energy storage units (20) are wedged in a base (48) of the blind receptacle (44) by a layer of heat-conducting glue (56).

11. The supply device (10) according to claim 1, wherein each of the receptacles (44, 144, 234) is a common receptacle to receive a pair of electrical energy storage units which are arranged in an adjacent manner in the common receptacle (44, 144, 234) which has an oblong form.

12. The supply device (10) according to claim 11, wherein the common receptacle is generally in the shape of a numeral "8".

13. The supply device (10) according to claim 11, wherein each of the receptacles (144) is generally in the shape of a half of a numeral "8".

14. The supply device (10) according to claim 1, wherein the tray (44, 134) is made of metal.

15. The supply device (10) according to claim 1, wherein the layer of heat-conducting resin is 2 mm or less.

16. The supply device (10) according to claim 1, wherein each of the receptacles has an upper opening and is delimited by a lower wall (48) and the wall (43) extending from the lower wall (48).

* * * * *